(12) United States Patent
Joo et al.

(10) Patent No.: US 9,517,661 B2
(45) Date of Patent: Dec. 13, 2016

(54) LOW NOISE TIRE

(71) Applicants: HYUNDAI MOTOR COMPANY, Seoul (KR); Kia Motors Corporation, Seoul (KR)

(72) Inventors: Yong Tae Joo, Ulwang-si (KR); Hyun Chul Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 188 days.

(21) Appl. No.: 14/569,447

(22) Filed: Dec. 12, 2014

(65) Prior Publication Data
US 2016/0001612 A1    Jan. 7, 2016

(30) Foreign Application Priority Data
Jul. 4, 2014    (KR) .................. 10-2014-0083856

(51) Int. Cl.
*B60C 19/00*    (2006.01)
*B60C 5/00*    (2006.01)

(52) U.S. Cl.
CPC ............... *B60C 19/002* (2013.04); *B60C 5/00* (2013.01)

(58) Field of Classification Search
CPC .................................................. B60C 19/002
See application file for complete search history.

(56) References Cited

U.S. PATENT DOCUMENTS 8,220,515 B2 * 7/2012 Aoki ..................... B60C 19/002
                                                                  152/155
8,430,143 B2    4/2013 Tanno

FOREIGN PATENT DOCUMENTS

| JP | 2003-345362 A | 12/2003 |
| JP | 2010-201997 A | 9/2010 |
| KR | 10-2009-0018418 A | 2/2009 |
| KR | 10-2013-0022893 A | 3/2013 |
| KR | 10-2013-0125604 A | 11/2013 |
| WO | 2013/074338 A1 | 5/2013 |

\* cited by examiner

*Primary Examiner* — Timothy Kennedy
(74) *Attorney, Agent, or Firm* — McDermott Will & Emery LLP

(57) ABSTRACT

The present disclosure relates to a low noise tire, and more specifically, to a low noise tire that includes: a sealant layer adhered to an inside surface of an inner liner of the tire; and a sound-absorbing material layer adhered to the sealant layer, in which the sound-absorbing material layer includes 50 to 90 wt % of a polypropylene melt-blown fiber and 10 to 50 wt % of a polymer fiber.

8 Claims, 3 Drawing Sheets

(a) → (b)

LOW NOISE TIRE

CROSS-REFERENCE TO RELATED APPLICATION

This application claims under 35 U.S.C. §119(a) the benefit of Korean Patent Application No. 10-2014-0083856 filed on Jul. 4, 2014, the entire contents of which are hereby incorporated by reference herein.

BACKGROUND (a) Technical Field

The present disclosure relates to a low noise tire. More particularly, it relates to a low noise tire composed of a structure in which a sound-absorbing material containing a polypropylene melt-blown fiber is adhered to a sealant layer at the inside surface of the inner liner of the tire.

(b) Background Art

Recently, as the power performance of vehicles has been enhanced, studies on enhancing performance of the tire have been actively conducted. The tires are the one part of the vehicle that only have contact with the ground surface among vehicle parts, and are an important part which significantly affects power delivery, direction change, fuel efficiency, and brake performance of a vehicle.

Such a tire is closely associated with noise and vibration performance generated during the driving as well as basic power performance. In particular, a main cause for road noise in a low frequency region of 200 to 250 Hz is a resonance sound generated as tires are driven, and an efficient method for reducing the resonance sound is most effective when the resonance sound is removed directly from tires. Since tires are mounted to the vehicle while being coupled to the vehicle wheels, the tire and wheel form a sealed structure, and are filled with air in a highly pressurized state of 30 to 40 psi. The sealed tire in the highly pressurized state is rotated by the engine output, generating a resonance sound due to the rotational force at a high speed.

In the related art, Korean Patent Application Laid-Open No. 2013-0022893 discloses a pneumatic tire in which a porous sound-absorbing material is adhered to a sealant layer including a butyl rubber, polyisobutylene, an inorganic additive and a vulcanizing agent on the inside surface, but has a limitation on minimizing the generation of sound by reducing the resonance sound.

Further, Japanese Patent Application Laid-Open No. 2010-201997 discloses a tire having a sound absorbing layer which is configured with nonwoven fabric fibers of which are oriented in the thickness direction on the inner surface of the tire, but the tire may have poor appearance and durability problems due to the nonwoven fabric.

Recently, in order to eliminate the problem of resonance sound, tires have been produced, in which a foamed urethane foam is adhered to the tire by using a double-coated tape and a toluene-based primer. Here, as a representative material for a sound-absorbing material for a tire universally used, a material processed by foaming polyurethane (PU) is used. However, a sound-absorbing material composed of polyurethane has a problem in that the material is hydrolyzed under moisture and high temperature conditions, and as a result, the NVH functions deteriorate due to breakage and damage of the sound-absorbing material. In addition, there may occur a problem that physical properties and the life-span of the tire deteriorate due to a decrease in adhesive force of the adhesive while driving in the field. Therefore, there is a need for studies which minimize the generation of noise and improve the performance of tires.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure describes an effort to solve the above-described problems associated with prior art.

An object of the present disclosure is to provide a low noise tire in which noise reduction performance and tire life-span are enhanced as compared to existing tires.

In one aspect, the present disclosure provides a low noise tire including: a sealant layer adhered to an inside surface of an inner liner of the tire; and a sound-absorbing material layer adhered to the sealant layer, in which the sound-absorbing material layer includes 50 to 90 wt % of a polypropylene melt-blown fiber and 10 to 50 wt % of a polymer fiber.

In a preferred embodiment, the sealant layer may include 20 to 40 wt % of a butyl rubber, 20 to 30 wt % of polybutene, and 35 to 50 wt % of a filler.

In another preferred embodiment, the filler may be one or more selected from the group consisting of carbon black, silica, mica, magnesium hydroxide, aluminum hydroxide, aluminum silicate, magnesium silicate, barium sulfate, calcium carbonate, talc, and clay.

In still another preferred embodiment, the sealant layer may have a thickness of 0.1 to 10 mm.

In yet another preferred embodiment, the polypropylene melt-blown fiber may have a diameter of 0.1 to 10 µm.

In still yet another preferred embodiment, the polymer fiber may be one or more selected from the group consisting of a polyethylene fiber, a polyester fiber, a polyethylene terephthalate fiber, a polybutylene terephthalate fiber, a polyamide fiber, a polyurethane fiber, a polylactic acid fiber, a polyvinyl alcohol fiber, a polyacrylonitrile fiber, and a polyphenylene sulfide fiber.

In a further preferred embodiment, the polymer fiber may have a diameter of 1 to 10 µm.

In another further preferred embodiment, the sound-absorbing material layer may have a thickness of 1 to 50 mm.

The low noise tire of the present disclosure enhances physical properties of the tire and simultaneously exhibits an excellent effect of reducing resonance sounds because a sound-absorbing material including a polypropylene melt-blown fiber is adhered thereto, and as a result, hydrolysis does not occur as compared to the existing foamed urethane.

The low noise tire of the present disclosure has an effect of increasing the tire replacement period due to excellent adhesive force without an increase in weight of the tire by using a high adhesion sealant to adhere the sound-absorbing material thereto.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
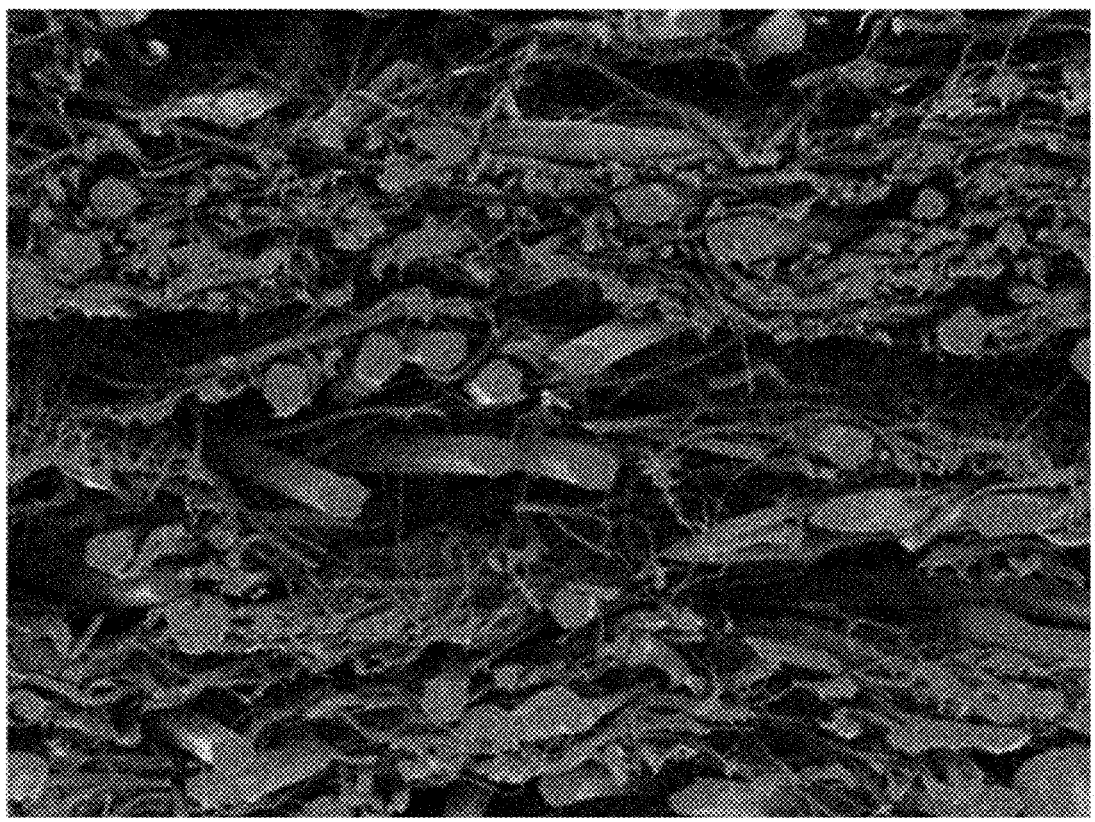
FIG. 1 illustrates a cross-sectional view of a sound-absorbing material according to the present disclosure.

Reference numerals set forth in the Drawings includes reference to the following elements as further discussed below:

| 10: Sound-absorbing material layer | 20: Sealant layer |
|---|---|
| 30: Tire | |

It should be understood that the appended drawings are not necessarily to scale, and present a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, an exemplary embodiment of the present disclosure will be described in more detail.

The low noise tire of the present disclosure includes: a sealant layer adhered to an inside surface of an inner liner; and a sound-absorbing material layer adhered to the sealant layer, in which the sound-absorbing material layer includes 50 to 90 wt % of a polypropylene melt-blown fiber and 10 to 50 wt % of a polymer fiber.

The sealant layer adhered to the inside surface of the inner liner may exhibit optimal adhesion performance when uniformly dispersed, and thus may be processed in the form of a film and used for uniform dispersion. In the film-making processing, the sealant may be introduced into an extruder, and then the film may be extracted through an extrusion mold by continuous processing. The sealant passing through the extrusion mold may be discharged as a thin film, and the film-type sealant may be adhered to the inner liner surface of the tire. Further, the sealant has a characteristic that the adhesive force does not deteriorate both at normal temperatures and at a temperature of 100° C. The sealant layer may include 20 to 40 wt % of a butyl rubber, 20 to 30 wt % of polybutene, and 35 to 50 wt % of a filler.

The sealant layer enhances durability due to excellent adhesive force, and thus has an effect of increasing the tire replacement period of the tire.

The filler may be one or more selected from the group consisting of carbon black, silica, mica, magnesium hydroxide, aluminum hydroxide, aluminum silicate, magnesium silicate, barium sulfate, calcium carbonate, talc, and clay. Preferably, carbon black may be used as the filler.

Meanwhile, since the inner liner surface of the tire forms unique embossing and curvature for each tire, and thus may affect adhesive force with the sound-absorbing material, it is preferable to adhere a sealant having an appropriate thickness. Thus, the sealant layer may have a thickness of 0.1 to 10 mm. When the sealant layer has a thickness less than 0.1 mm, adhesion performance of the tire and the sound-absorbing material may deteriorate. On the contrary, when the thickness is more than 10 mm, adhesion performance of the tire and the sound-absorbing material is excellent, but there may be a problem that the tire weight increases as the weight of the sealant increases. It is preferred to use the sealant having a thickness of preferably 0.2 to 2 mm.

The sound-absorbing material layer may include 50 to 90 wt % of a polypropylene melt-blown fiber and 10 to 50 wt % of a polymer fiber. The polypropylene melt-blown fiber is a microfiber having a micro fineness, which is processed by high pressure hot air by spinning a polymer, and has excellent flexibility, sound-absorption, durability and the like. In this case, the polypropylene melt-blown fiber may have a diameter of 0.1 to 10 μm. Preferably, the diameter may be 0.3 to 7 μm. FIG. 1 illustrates a cross-sectional view of a sound-absorbing material according to the present disclosure.

The polymer fiber has excellent compression resilience and durability, and thus enhances sound-absorbing performance. In this case, when the content of the polymer fiber is less than 10 wt %, there may be a problem that the compression resilience performance deteriorates. On the contrary, when the content is more than 50 wt %, the sound-absorbing performance is excellent in a low frequency region, but there may be a problem that the weight of the tire increases and durability deteriorates. In this case, the polymer fiber may have a diameter of 1 to 10 μm.

The polymer fiber may be one or more selected from the group consisting of a polyethylene fiber, a polyester fiber, a polyethylene terephthalate fiber, a polybutylene terephthalate fiber, a polyamide fiber, a polyurethane fiber, a polylactic acid fiber, a polyvinyl alcohol fiber, a polyacrylonitrile fiber, and a polyphenylene sulfide fiber. Preferably, a polyethylene fiber may be used as the polymer fiber.

The sound-absorbing material layer may have a thickness of 1 to 50 mm in the form of a nonwoven fabric. In this case, when the sound-absorbing material layer has a thickness less than 1 mm, there may be a problem that the sound-absorbing performance of the tire deteriorates. On the contrary, when the thickness is more than 50 mm, there may be a problem that the weight of the tire increases and the manufacturing cost increases.

The low noise tire of the present disclosure enhances physical properties of the tire and simultaneously exhibits an excellent effect of reducing resonance sounds because a sound-absorbing material including a polypropylene melt-blown fiber is adhered thereto, and as a result, hydrolysis does not occur as compared to the existing foamed urethane.

The low noise tire of the present disclosure has an effect of increasing the tire replacement period due to excellent adhesive force without an increase in weight of the tire by using a high adhesion sealant to adhere the sound-absorbing material thereto.

Hereinafter, the present disclosure will be described in more detail with reference to Examples, but is not limited by the Examples.

EXAMPLES

The following examples illustrate the disclosure and are not intended to limit the same.

Example 1

A sound-absorbing material was prepared in the form of a nonwoven fabric by a process of melting 65 wt % of a polypropylene melt-blown fiber under the condition of 210° C., incorporating 35 wt % of a polyethylene fiber thereto, and spinning the mixture. 30 wt % of a butyl rubber, 28 wt % of polyisobutylene, and 42 wt % of carbon black were mixed and the mixture was processed in the form of a film to prepare a sealant film having a thickness of 0.1 mm. And then, the sealant film was used to form a sealant layer having a thickness of 0.1 mm at the inside surface of the inner liner of the tire. The sound-absorbing material having a thickness of 10 mm was adhered to the sealant layer formed to prepare the tire.

Figure 2:
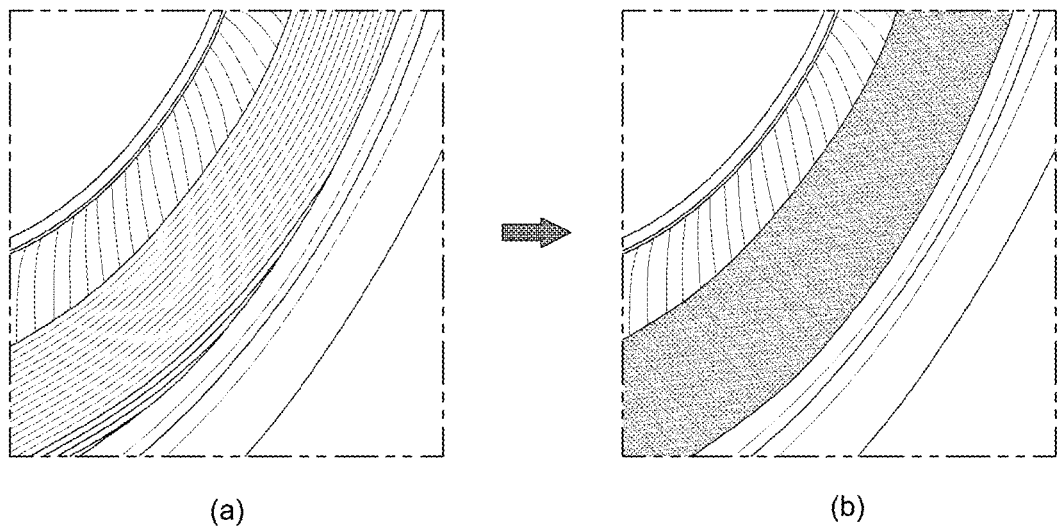
FIG. 2 illustrates (a) a sealant layer adhered to the inside surface of the inner liner of the tire according to the present disclosure, and (b) a sound-absorbing material layer adhered to the sealant layer.

FIG. 2 illustrates (a) a sealant layer adhered to the inside surface of the inner liner of the tire according to the present disclosure, and (b) a sound-absorbing material layer adhered to the sealant layer.

Figure 3:
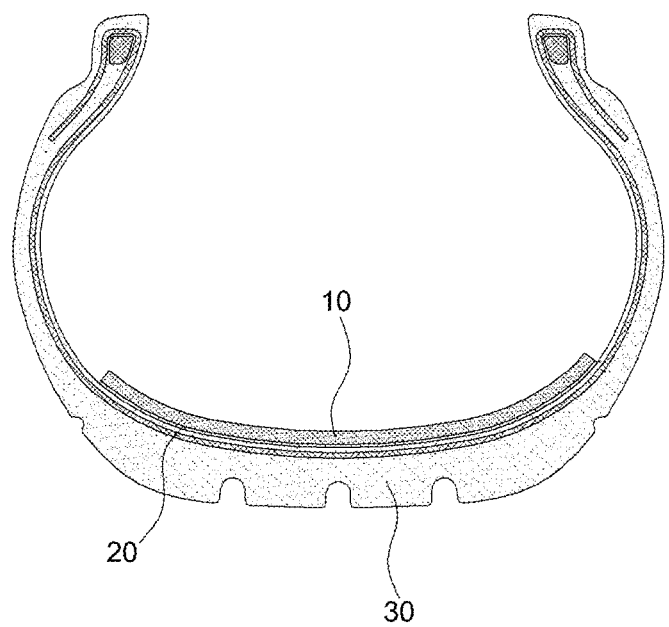
FIG. 3 illustrates a side cross-sectional view of a low noise tire according to the present disclosure.

FIG. 3 illustrates a side cross-sectional view of a low noise tire according to the present disclosure. Referring to FIG. 3, the low noise tire 1 according to the present disclosure forms a sealant layer 2 at the inside surface of the inner liner, and includes an adhered sound-absorbing material layer 3.

Examples 2 to 4

A tire was prepared in the same manner as in Example 1, except that the thicknesses of the sealant layer and the sound-absorbing material layer were varied as shown in the following Table 1.

Comparative Example 1

The sealant film was applied to the inside surface of the inner liner of the tire to form a sealant layer having a thickness of 0.1 mm. And then, a sound-absorbing material (polyurethane, PU) applied to the existing tire was adhered in a thickness of 10 mm to the sealant layer to prepare the tire.

Comparative Examples 2 to 4

A tire was prepared in the same manner as in Comparative Example 1, except that the thicknesses of the sealant layer and the sound-absorbing material layer were varied as shown in the following Table 1.

TABLE 1

| | Examples | | | | Comparative Examples | | | |
|---|---|---|---|---|---|---|---|---|
| Classification | 1 | 2 | 3 | 4 | 1 | 2 | 3 | 4 |
| Sealant thickness (mm) | 0.1 | 0.5 | 1.0 | 2.0 | 0.1 | 0.5 | 1.0 | 2.0 |
| Sound-absorbing material thickness (mm) | 10 | 20 | 10 | 20 | 10 | 20 | 10 | 20 |
| Material for sound-absorbing material | PP + PET | PP + PET | PP + PET | PP + PET | PU | PU | PU | PU |

TEST EXAMPLES

Test Example 1

In order to evaluate the sound-absorbing performance in Examples 1 to 4 and Comparative Examples 1 to 4, a tire cleat impact evaluation device was used to evaluate the sound-absorbing performance under the conditions of a test load of 450 kg, a pneumatic pressure of 32 psi, and a test speed of 60 km/h in a low frequency region of 200 to 250 Hz. The results are shown in the following Table 2.

TABLE 2

| | Examples | | | | Comparative Examples | | | |
|---|---|---|---|---|---|---|---|---|
| Classification | 1 | 2 | 3 | 4 | 1 | 2 | 3 | 4 |
| Peak reduction amount (dB) | 6.1 | 8.4 | 6.2 | 8.6 | 4.4 | 6.2 | 4.5 | 6.3 |

According to the results in Table 2, when the tires prepared in Examples 1 to 4 were compared to those in Comparative Examples 1 to 4, it was observed that the peak reduction amount value was higher in a low frequency region, and it could be confirmed that a sound-absorbing material including a polypropylene melt-blown fiber was uniformly adhered to the tires with a high adhesion sealant to enhance the sound-absorbing performance of the low noise tires prepared in Examples 1 to 4.

In addition, it could be confirmed that for the tires prepared in Examples 1 to 4 and Comparative Examples 1 to 4, the change in weight depending on the thickness of the sealant and the thickness of the sound-absorbing material does not affect an increase in weight at an equivalent level.

Test Example 2

In order to evaluate the resonance sound reduction effect for the sound-absorbing materials prepared in Example 1 and Comparative Example 1, a microphone device was used to evaluate the sound pressure of the sound-absorbing material at each frequency under real driving conditions at a speed of 60 km/h.

Figure 4:
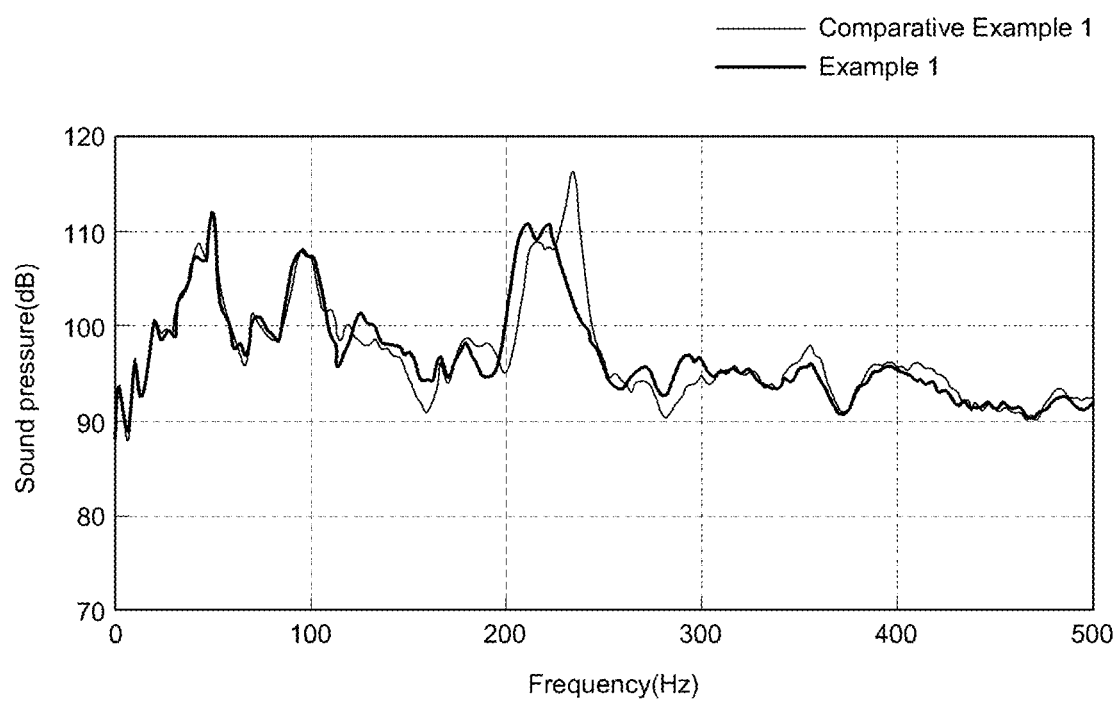
FIG. 4 is a graph showing the results of reducing resonance sounds for the sound-absorbing materials prepared in Example 1 and Comparative Example 1 of the present disclosure.

FIG. 4 is a graph showing the results of reducing resonance sounds for the sound-absorbing materials prepared in Example 1 and Comparative Example 1 of the present disclosure. As can be confirmed in the graph, for the sound-absorbing materials prepared in Example 1 and Comparative Example 1, the peak reduction amounts of the resonance sound all increased as the thickness increased. However, considering that the sound pressure in the sound-absorbing material including a polypropylene melt-blown fiber prepared in Example 1 was lower than that in the sound-absorbing material prepared in Comparative Example 1 in a low frequency region of 200 to 300 Hz, it could be confirmed that the sound reduction effect in a low frequency region was excellent.

The low noise tire of the present disclosure enhances physical properties of the tire and simultaneously exhibits an excellent effect of reducing resonance sounds because a sound-absorbing material including a polypropylene melt-blown fiber is adhered thereto, and as a result, hydrolysis does not occur as compared to the existing foamed urethane. Furthermore, there is an effect of increasing the tire replacement period due to excellent adhesive force without an increase in weight of the tire by using a high adhesion sealant to adhere the sound-absorbing material thereto.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A low noise tire comprising: a sealant layer adhered to an inside surface of an inner liner of a tire; and
   a sound-absorbing material layer adhered to the sealant layer,
   wherein the sound-absorbing material layer comprises 50 to 90 wt % of a polypropylene melt-blown fiber and 10 to 50 wt % of a polymer fiber.

2. The low noise tire of claim 1, wherein the sealant layer comprises 20 to 40 wt % of a butyl rubber, 20 to 30 wt % of polybutene, and 35 to 50 wt % of a filler.

3. The low noise tire of claim 2, wherein the filler is one or more selected from the group consisting of carbon black, silica, mica, magnesium hydroxide, aluminum hydroxide, aluminum silicate, magnesium silicate, barium sulfate, calcium carbonate, talc, and clay.

4. The low noise tire of claim 1, wherein the sealant layer has a thickness of 0.1 to 10 mm.

5. The low noise tire of claim 1, wherein the polypropylene melt-blown fiber has a diameter of 0.1 to 10 μm.

6. The low noise tire of claim 1, wherein the polymer fiber is one or more selected from the group consisting of a polyethylene fiber, a polyester fiber, a polyethylene terephthalate fiber, a polybutylene terephthalate fiber, a polyamide fiber, a polyurethane fiber, a polylactic acid fiber, a polyvinyl alcohol fiber, a polyacrylonitrile fiber, and a polyphenylene sulfide fiber.

7. The low noise tire of claim 1, wherein the polymer fiber has a diameter of 1 to 10 μm.

8. The low noise tire of claim 1, wherein the sound-absorbing material layer has a thickness of 1 to 50 mm.

* * * * *